(12) United States Patent
Peng et al.

(10) Patent No.: US 7,317,740 B2
(45) Date of Patent: Jan. 8, 2008

(54) MODE LOCKER FOR FIBER LASER

(75) Inventors: Jin-Long Peng, Taoyuan County (TW); Hyeyoung Ahn, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/468,305

(22) Filed: Aug. 30, 2006

(65) Prior Publication Data

US 2007/0153844 A1    Jul. 5, 2007

(30) Foreign Application Priority Data

Dec. 30, 2005    (TW)    .............................. 94147506 A
Jun. 28, 2006    (TW)    .............................. 95123290 A

(51) Int. Cl.
*H01S 3/30* (2006.01)
*H01S 3/098* (2006.01)
*H01S 3/08* (2006.01)

(52) U.S. Cl. .......................... 372/18; 372/6; 372/101; 372/107

(58) Field of Classification Search .................... 372/6, 372/18, 101, 107
See application file for complete search history.

(56) References Cited

U.S. PATENT DOCUMENTS

| 5,513,194 A | 4/1996 | Tamura et al. |
| 5,617,434 A | 4/1997 | Tamura et al. |
| 2005/0201432 A1* | 9/2005 | Uehara et al. ................ 372/30 |

* cited by examiner

*Primary Examiner*—Armando Rodriguez
(74) *Attorney, Agent, or Firm*—Jianq Chyun IP Office

(57) ABSTRACT

A mode locking device of fiber laser includes a bar structural body, having a central hollow region, extending along a reference line of the bar structural body. The central hollow region has two ends coupled with two collimators on a fiber laser loop. A polarization dependent isolator is disposed within the central hollow region of the bar structural body such that the laser ca propagate only in one direction. Several rotors are disposed within the central hollow region of the bar structural body. Each rotor has a protruding piece, for rotating the rotor along the reference line. The laser beam travels along the reference line and passes through the rotors. Several retardation waveplates are disposed on the rotator structures and can be rotated together with the rotors. Each waveplate is adjusted to an angle, such that the laser can be mode-locked automatically.

16 Claims, 4 Drawing Sheets

MODE LOCKER FOR FIBER LASER

CROSS-REFERENCE TO RELATED APPLICATION

This application claims the priority benefit of Taiwan applications serial no. 94147506, filed on Dec. 30, 2005, and serial no. 95123290, filed on Jun. 28, 2006. All disclosures of the Taiwan application are incorporated herein by reference.

BACKGROUND OF THE INVENTION

1. Field of Invention

The present invention relates to a mode-locked fiber laser technology. More particularly, the present invention relates to a mode-locking device in the polarization additive pulse mode-locked (P-APM) fiber laser, in which a mode locking unit is integrated into a solid, small volume structure and assembled into a compact mode-locked fiber laser, decreasing ambient interferences.

2. Description of Related Art

Being likely to be interfered by ambient interferences to lose mode-locking, P-APM fiber laser, published in 1992, was not commercialized immediately. Along with the development of highly-doped fiber laser, the length of fibers of fiber laser has been getting shorter, slightly decreasing the sensitivity of fiber laser to ambient interferences, which makes it be possible to commercialize this kind of mode-locked fiber laser. However, the production of a stable node-locked fiber laser relies on the design of whole laser system. It is a great task to design a laser to be compact so as to prepare a stable environment to resist ambient interferences.

FIG. 1 is a schematic drawing of the architecture of a conventional P-APM fiber laser. A pump laser 100 provides a laser source. A wavelength division multiplexer (WDM) 102 couples the pump laser into a gain fiber 104, which is doped with rare earth element, e.g. Er. The pump laser excites the rare earth element to produce laser radiation entering the mode locking unit through lenses 106 and 116. The mode locking unit consists of two groups of retardation waveplates 108 and 114 and a polarization dependent isolator 112. A group of retardation waveplates 118 consists of two $\lambda/4$ waveplates; the other group of retardation waveplates 114 consists of a $\lambda/4$ waveplate and a $\lambda/2$ waveplate. The laser radiation with a component in polarized state is coupled out through a polarizing splitter 110.

If components of the mode locking unit are disposed loosely in the laser system, not only the assembling size of the whole system is very big, but also the respective components are likely to be interfered by various ambient factors, degrading the performance of laser. The mode-locking mechanism of P-APM is likely to be interfered by ambient factors, for example, pressure, shake, and temperature variation. If the volume of the mode locker is sizeable, it is hard to design a compact laser system resisting the interferences of the above factors.

SUMMARY OF THE INVENTION

The present invention provides a mode-locking device of fiber laser, it is called as mode locker, in which the components necessary for mode locking, like retardation waveplates and polarization dependent isolator, are integrated into a single stable structural body to decrease the volume, so that the design of laser is compact and good for decreasing ambient interferences.

The present invention provides a mode locked fiber laser system, using a integrated mode locker to decrease the assembled volume of the fiber laser system so as to make the laser system design compact and easy for preparing a stable environment for the laser to reduce ambient interferences, e.g. temperature-stabilizing the laser to achieve a stable mode-locking.

The mode locker of fiber laser of the present invention includes a bar structural body, having a central hollow region, extending along a reference line of the bar structural body. The central hollow region has two ends for coupling with two collimators on a fiber laser loop to form a close optical route. A polarization dependent isolator is disposed within the central hollow region of the bar structural body so that laser beam can only propagate in one direction. Several rotors are disposed within the central hollow region of the bar structural body. Each rotor has a protruding piece for rotating the rotator structure along the reference line. The laser beam travels along the reference line and passes through the rotors. Several retardation waveplates are disposed on the rotors and can be rotated together with the rotors. Each waveplate is adjusted to an angle, such that the laser can be mode-locked automatically.

According to an embodiment of the present invention, in the aforementioned mode locker of fiber laser, the retardation waveplates can be, for example, divided into two sets. One retardation set includes, for example, two $\lambda/4$ waveplates, and the other retardation set includes, for example, one $\lambda/4$ waveplate and one $\lambda/2$ waveplate. Or alternatively in example, each of the retardation sets includes, for example, one $\lambda/4$ waveplate and one $\lambda/2$ waveplate, wherein one of the $\lambda/2$ waveplates can be disposed at the output end of the polarization dependent isolator.

The fiber laser system of the present invention includes a laser unit providing a pump laser source, a gain fiber, a wavelength division multiplexer coupling the pump laser into the gain fiber to excite the gain fiber, two collimators, an optical coupler coupling out the power of the laser, a mode locker whose two ends respectively connected to the two collimators to mode-lock the laser, wherein the mode locker includes the structure of the aforementioned mode locking device.

In order to make the aforementioned and other objects, features and advantages of the present invention comprehensible, a preferred embodiment accompanied with figures is described in detail below.

DESCRIPTION OF THE PREFERRED EMBODIMENTS

The present invention provides a mode locker of fiber laser, whose mechanical structure is integrated into a stable structural body in a small volume, easy to be installed in fiber lasers. Several embodiments are illustrated below. The present invention is not limited to these embodiments.

Figure 1:
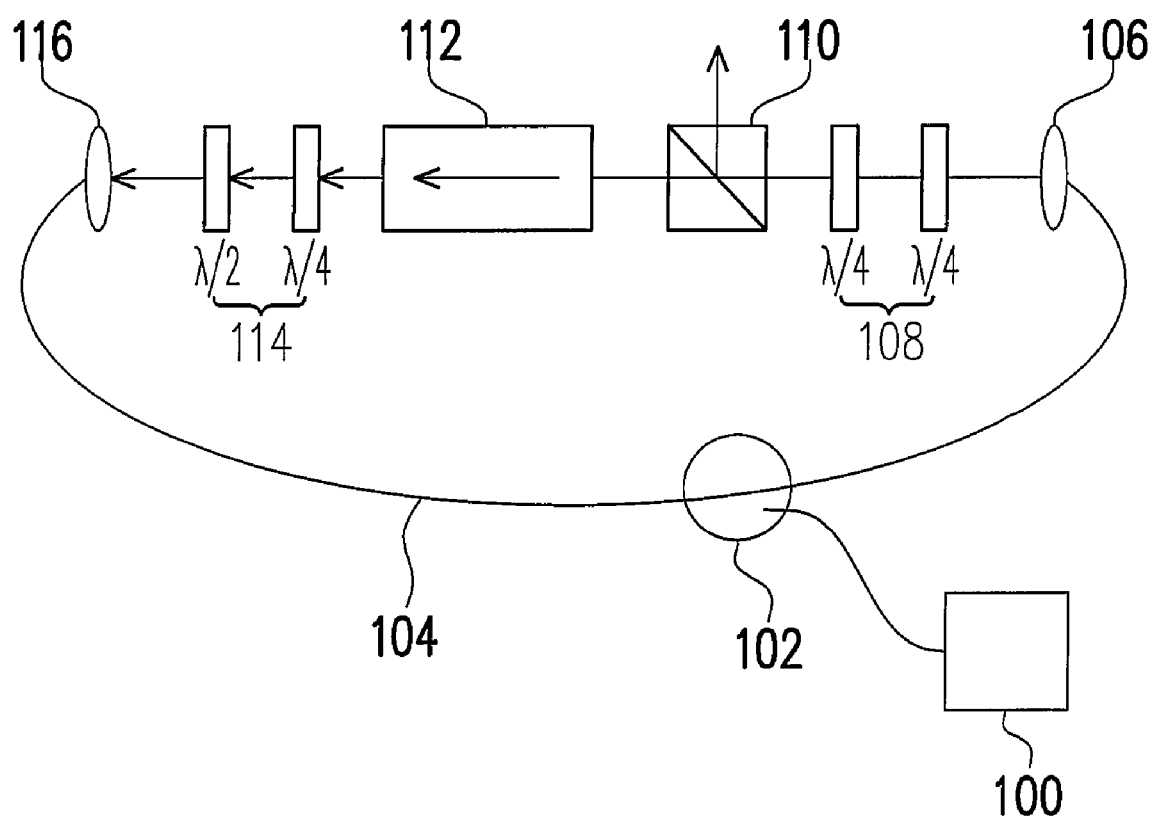
FIG. 1 is a schematic drawing of the architecture of a conventional P-APM fiber laser.
Figure 2:
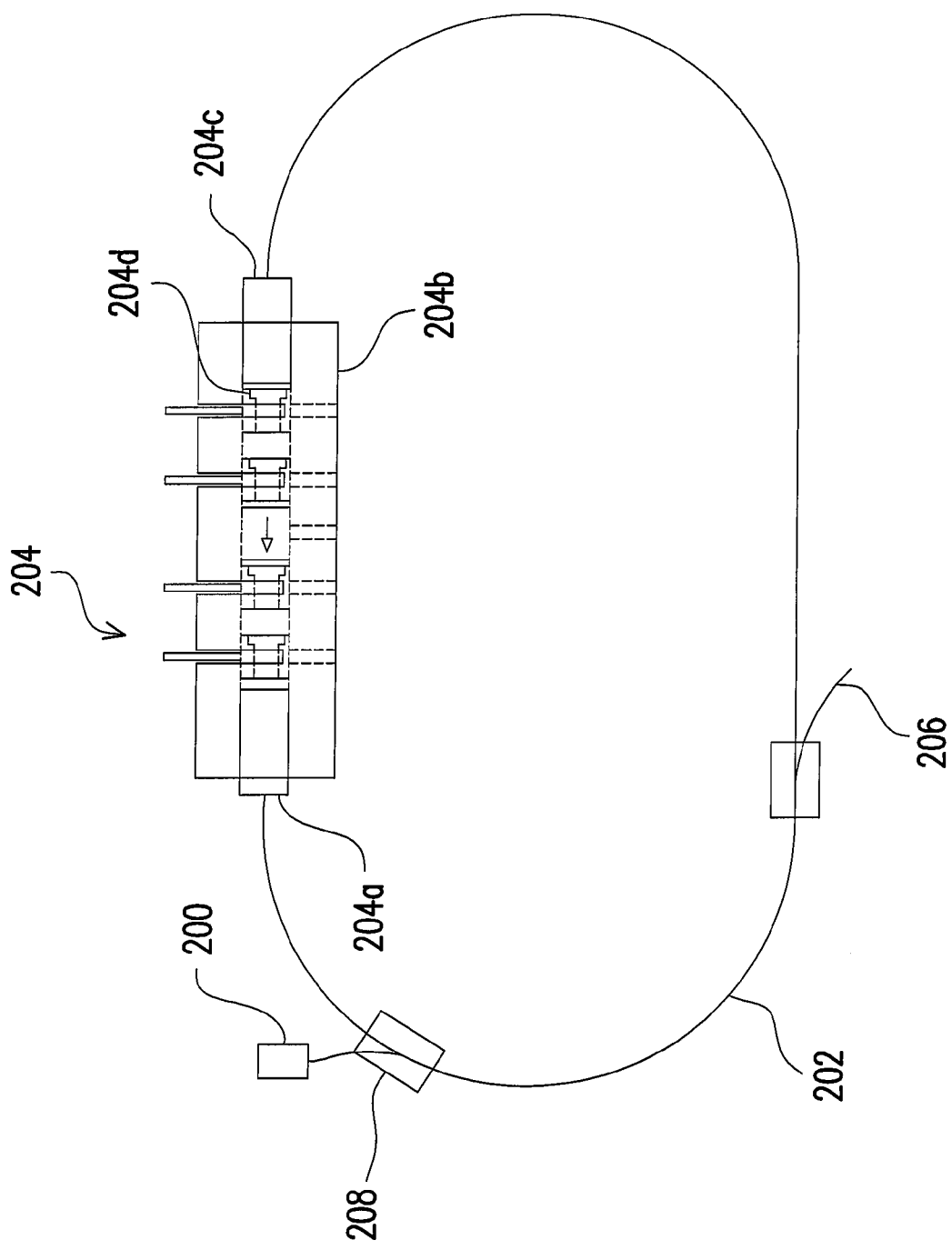
FIG. 2 is a schematic drawing showing the architecture of a P-APM laser according to an embodiment of the present invention.

FIG. 2 is a schematic drawing showing the architecture of a P-APM laser according to an embodiment of the present invention. Referring to FIG. 2, the architecture of a P-APM laser includes a laser unit 200 providing a pump laser source, and a wavelength division multiplexer (WDM) 208 coupling the pump laser into a gain fiber 202 to pump the gain fiber 202. The fiber 202 is usually a fiber doped with rare earth element, e.g. Er. The laser power can be coupled out by an optical coupler 206.

Two collimators 204a and 204c are connected to the mode locker 204 to collimate the laser beam passing the mode locker. The collimators 204a and 204c have other terminals respectively connected to the wavelength division multiplexer 208 and the optical coupler 206.

Figure 3:
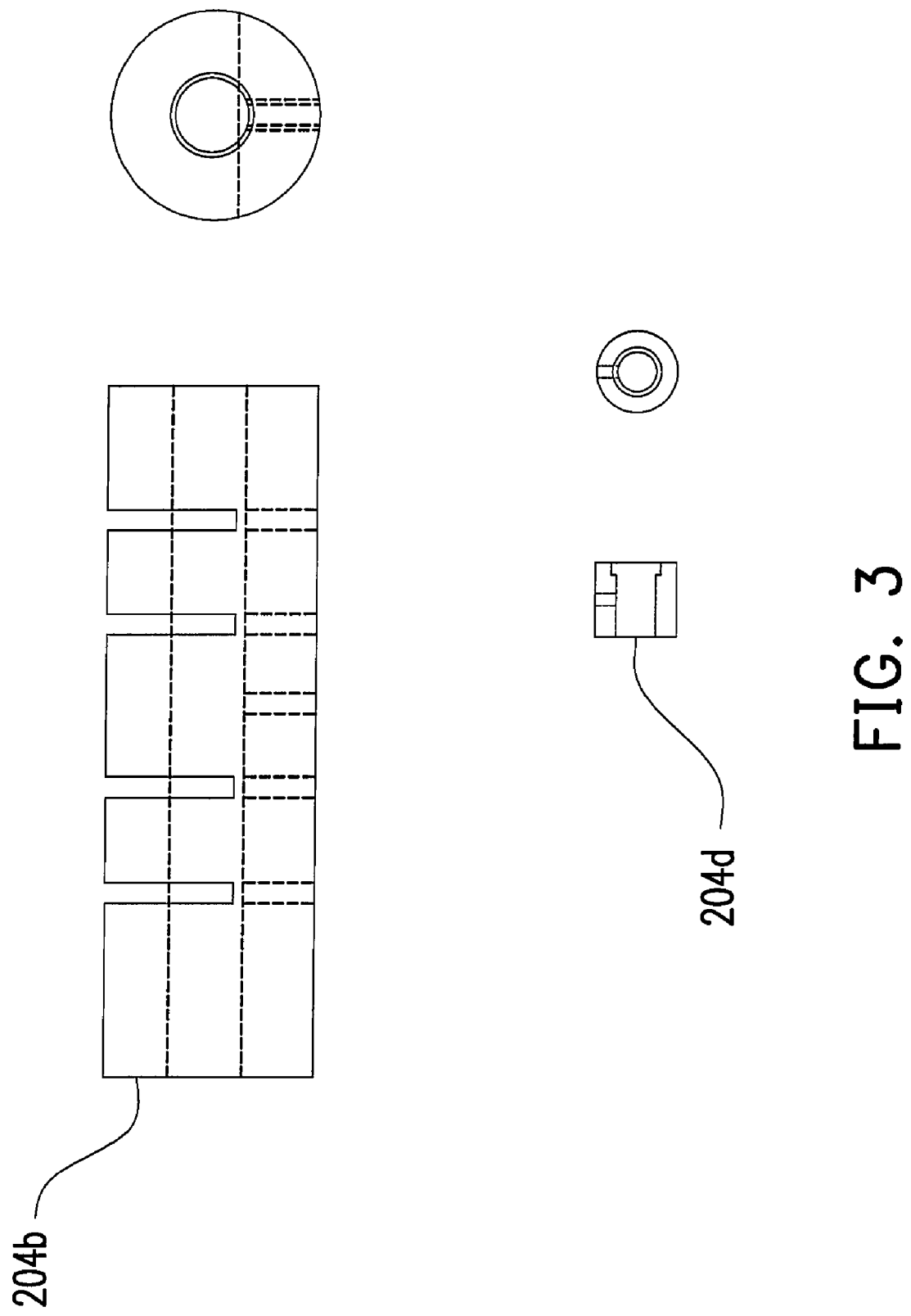
FIG. 3 is a schematic drawing illustrating the structure of the mode locker according to an embodiment of the present invention.

The structure of the mode locker 204 can further be referred to FIG. 3 illustrating a schematic drawing of the structure of the mode locker according to an embodiment of the present invention.

In FIG. 2 and FIG. 3, the mode locker 204 includes a bar structural body 204b, having a central hollow region extending along a reference line of the bar structural body. The reference line can be, for example, a center reference line or an off-center reference line. The central hollow region has two ends for coupling with two collimators 204a and 204b on a fiber laser loop to form a close optical route.

A polarization dependent isolator is disposed within the central hollow region of the bar structural body, as shown by an arrow. The polarization dependent isolator allows the laser beam to propagate only in one direction. Arrow indicates the propagating direction of the laser beam.

Several, for example four, rotors 204d are disposed within the central hollow region of the bar structural body. The rotors 204d can be, for example, two on one side of the polarization dependent isolator and two rotors on another side of the polarization dependent isolator. Each rotor 204d has a protruding piece protruding from the bar structural body 204b. Through the protruding pieces users can rotate the protruding piece so as to rotate the rotors 204d along the reference line as a rotation axis. The center of the rotors 204d is also centrally hollow, so that the laser beam can pass through these rotors 204d along the reference line.

The protruding pieces of the rotors can be, for example, stick-shaped and protrude out from a slot of the bar structural body 204b, so that it is helpful to rotate the rotors 204d from outside. Since the protruding pieces can be a thin stick-shaped, the length of the bar structural body 204b can be correspondingly reduced.

In addition, several retardation waveplates can be disposed on the rotors and rotate together with the rotors. Each waveplate is adjusted to an angle, such that the laser can be mode-locked. Generally, the number of the retardation waveplates can be, for example, four. The retardation waveplates can be, for example, divided into two sets. One retardation set includes, for example, two $\lambda/4$ waveplates, and the other retardation set includes, for example, one $\lambda/4$ waveplate and one $\lambda/2$ waveplate. Or alternatively in example, each of the retardation sets includes, for example, one $\lambda/4$ waveplate and one $\lambda/2$ waveplate, wherein the $\lambda/2$ waveplate can be preferably disposed at the output end of the polarization dependent isolator, including, for example, three $\lambda/4$ waveplates and one $\lambda/2$ waveplate. The retardation waveplates are used for tuning the phase delay of the incident light. When the angles of the four retardation waveplates are respectively adjusted to appropriate positions, proper elliptical polarization is generated and the laser can be mode-locked. As a result, the laser beam is converted into a pulse laser signal in mode-lock for output.

From side views in two directions of the bar structural body 204d and the rotor 204d in FIG. 3, the basic structure of the present invention can be seen. After the rotors 204d are disposed in the predetermined places of the center hollow region of the bar structural body 204b, the protruding pieces of the rotators structures 204d can be connected together with the rotor structures 204d, so that those rotors 204d can be rotated. According to the structure of the mode locker of the present invention, in the same principle, those skilled in this art might make some changes during designing, but not departing from the scope of the present invention.

The bar structural body 204b shown in the figures takes a cylinder shape as example. Actually, it can be a quadrangle or polygonal bar, or it can be formed by an even surface and a round curved surface.

Figure 4:
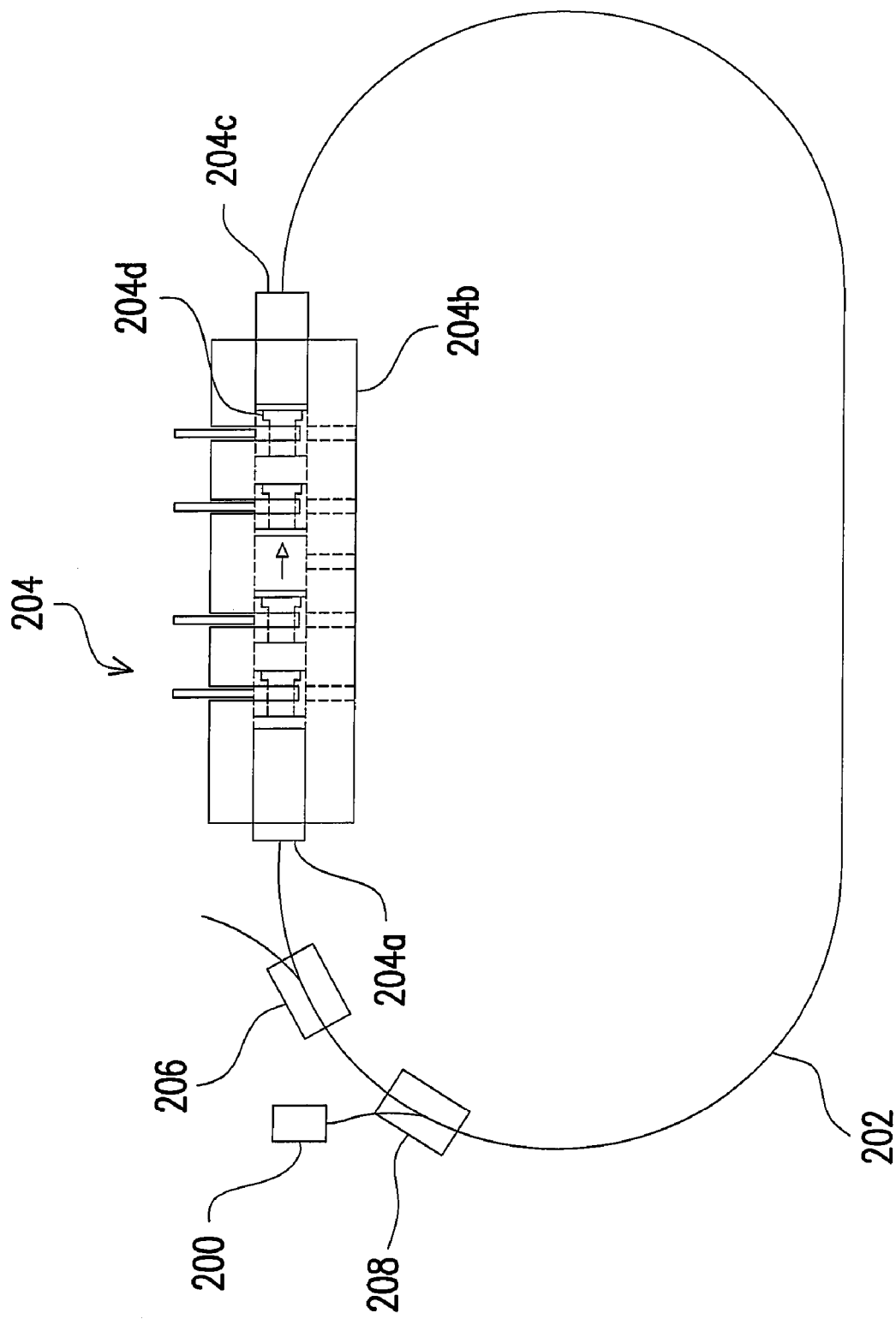
FIG. 4 is a schematic drawing illustrating the architecture of another P-APM laser with opposite laser propagation direction to that in FIG. 2, according to an embodiment of the present invention.

In addition, FIG. 2 shows the laser structure arranged in forward direction. According to the same principle in FIG. 2, it can be modified into a backward direction, as can be known by the one in ordinary skill, FIG. 4 is a schematic drawing illustrating the architecture of another P-APM laser with opposite laser propagation direction to that in FIG. 2, according to an embodiment of the present invention. The propagation direction of the laser beam in FIG. 4, as indicated by the arrow of the polarization dependent isolator, is opposite to the direction in FIG. 2. In FIG. 4, the optical coupler 206 is disposed between the wavelength division multiplexer 208 and the collimator 204a. The direction of the polarization dependent isolator in the mode locker 204 is opposite to that in FIG. 2, so that the laser beam is propagating in opposite direction. However, the principle is the same as the mechanism of propagation of laser beam in FIG. 2. Both are using mode locker 204 to achieve the mode locking effect.

In the mode locker of the present invention, the retardation waveplates and the polarization dependent isolator are integrated into a small and stable structural body, so that the design of a mode-locked fiber laser based on it can be compact. Such a compact design can help easily preparing a stable environment for the laser system, e.g. temperature-stabilizing the laser system to reduce the ambient temperature effect and a highly stable mode locking can be achieved. Furthermore, the mode locker can be tight and can prevent pollution of optics inside and reduce the effect of air turbulence on the frequency-stability of the laser. Through the protruding sticks, the retardation waveplates can be expediently adjusted to the required angles and still keep the mode locker tight.

The mode locker of the present invention has a compact and tight structural body and a mechanism adjusting retardation waveplates easily. The compact structural body also allows the mode-locker to be easily integrated in the laser systems requiring mode-locking. The novel design of the mode locker provided by the present invention can help building a compact laser system, which can be conveniently embedded in other system. Furthermore, the laser mode locker structure, achieving easy operation and stable effect, has an inventive step to conventional laser systems.

The present invention is disclosed above with its preferred embodiments. It is to be understood that the preferred embodiment of present invention is not to be taken in a limiting sense. It will be apparent to those skilled in the art that various modifications and variations can be made to the structure of the present invention without departing from the scope or spirit of the invention. The protection scope of the present invention is in accordant with the scope of the following claims and their equivalents.

What is claimed is:

1. A mode locking device of fiber laser, for a fiber laser loop, to change a laser beam into a pulse laser signal in mode-locking for output, comprising:
   a bar structural body, having a central hollow region extending along a reference line of the bar structural body, with the two ends of the central hollow region coupled with two collimators on a fiber laser loop to form a close optical route;
   a polarization dependent isolator, disposed within the central hollow region of the bar structural body;
   a plurality of rotors, disposed within the central hollow region of the bar structural body, wherein each rotor has a protruding piece; and through the protruding pieces the rotors can be rotated along the reference line; and the laser beam can pass through these rotors along the reference line; and
   a plurality of retardation waveplates, respectively disposed on the rotors and rotating together with the rotors, wherein each of the retardation waveplates is adjusted to an angle, such that the laser beam can be mode-locked and output as the pulse laser signal.

2. The mode locking device of fiber laser as claimed in claim 1, wherein the number of the rotor is four, two being disposed on one side of the polarization dependent isolator while the other two being disposed on the other side of the polarization dependent isolator.

3. The mode locking device of fiber laser as claimed in claim 2, wherein the retardation waveplates are divided into two sets, wherein one retardation set includes two $\lambda/4$ waveplates and the other retardation set includes one $\lambda/4$ waveplate and one $\lambda/2$ waveplate; or each of the retardation sets includes one $\lambda/4$ waveplate and one $\lambda/2$ waveplate, one of the $\lambda/2$ waveplates is disposed at an output end of the polarization dependent isolator.

4. The mode locking device of fiber laser as claimed in claim 1, wherein the bar structural body includes the polarization dependent isolator, the rotors, and the retardation waveplates to form an integrated structure.

5. The mode locking device of fiber laser as claimed in claim 1, wherein the protruding piece of each rotor is protruding out the bar structural body.

6. The mode locking device of fiber laser as claimed in claim 5, the protruding piece is a stick-shaped.

7. The mode locking device of fiber laser as claimed in claim 1, wherein the bar structural body includes a quadrangle or polygonal bar, an even surface, or a round curved surface.

8. A fiber laser system, comprising:
   a laser unit, providing a pump laser;
   a gain fiber;
   a wavelength division multiplexer, coupling the pump laser into the gain fiber to excite the gain fiber;
   an optical coupler, coupling out the power of the laser radiation;
   two collimators; and
   a mode locker, having two ends respectively coupled with the two collimators to mode-lock the laser, wherein the mode locker comprises:
      a bar structural body, having a central hollow region extending along a reference line of the bar structural body, with two ends of the central hollow region coupled with the two collimators to form a close optical route for the laser;
      a polarization dependent isolator, disposed within the central hollow region of the bar structural body;
      a plurality of rotors, disposed within the central hollow region of the bar structural body, wherein each rotator structure has a protruding piece protruding from the bar structural body; and through the protruding pieces the rotor can be rotated along the reference line; and the laser beam can pass through these rotors along the reference line; and
      a plurality of retardation waveplates, respectively disposed on the rotors and rotating together with the rotors, wherein each of the retardation waveplates is adjusted to an angle, such that the laser can be mode-locked.

9. The fiber laser system as claimed in claim 8, wherein the number of the rotor is four, two of them being on one side of the polarization dependent isolator while the other two on the other side of the polarization dependent isolator.

10. The fiber laser system as claimed in claim 9, wherein the four retardation waveplates of the mode locker are divided into two sets, wherein one retardation set includes two $\lambda/4$ waveplates and the other retardation set includes one $\lambda/4$ waveplate and one $\lambda/2$ waveplate; or each of the retardation sets includes one $\lambda/4$ waveplate and one $\lambda/2$ waveplate, one of the $\lambda/2$ waveplates is disposed at an output end of the polarization dependent isolator.

11. The fiber laser system as claimed in claim 8, wherein the bar structural body of the mode locker can contain the polarization dependent isolator, the rotors, and the retardation waveplates to form an integrated structure.

12. The fiber laser system as claimed in claim 8, wherein the protruding piece of each of the rotors of the mode locker is protruding out the bar structural body.

13. The fiber laser system as claimed in claim 12, wherein the protruding piece is a stick-shaped.

14. The fiber laser system as claimed in claim 8, wherein the bar structural body of the mode locker includes a quadrangle or polygonal bar, an even surface, or a round curved surface.

15. The fiber laser system as claimed in claim 8, wherein the gain fiber is a fiber doped rare earth element.

16. The fiber laser system as claimed in claim 8, wherein the gain fiber is a fiber doped with Er.

* * * * *